Sept. 22, 1925.
C. A. GODSHALK
AUTOMOBILE LOCK
Filed May 2, 1923
1,554,815
4 Sheets-Sheet 1
FIG. I.
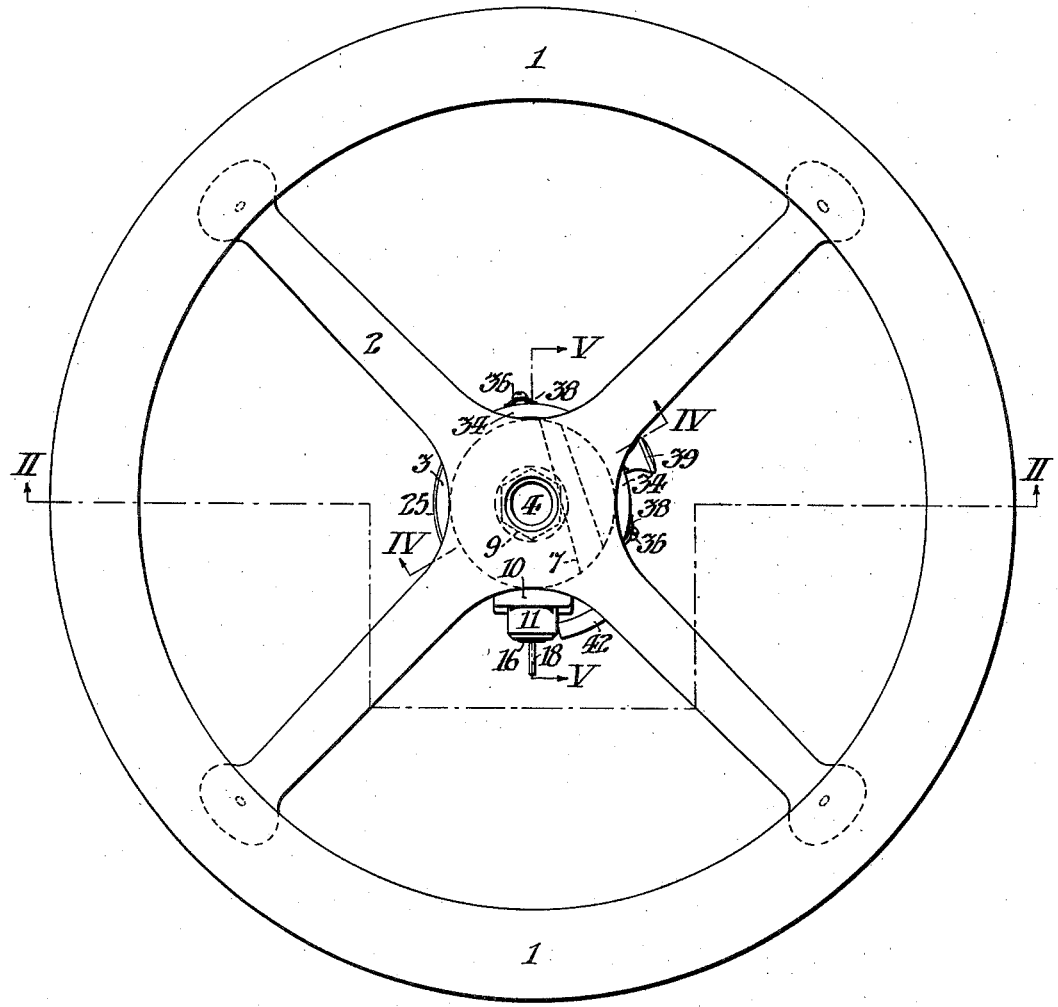
FIG. II.
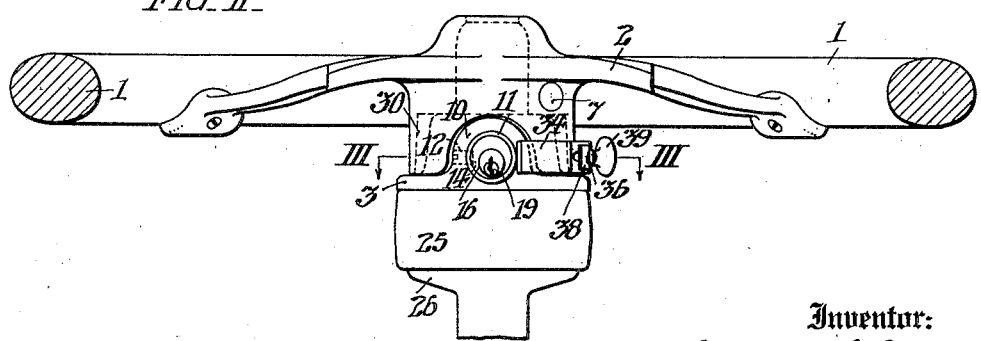
Inventor:
CLARENCE A. GODSHALK,
by Arthur E. Paige
Attorney.

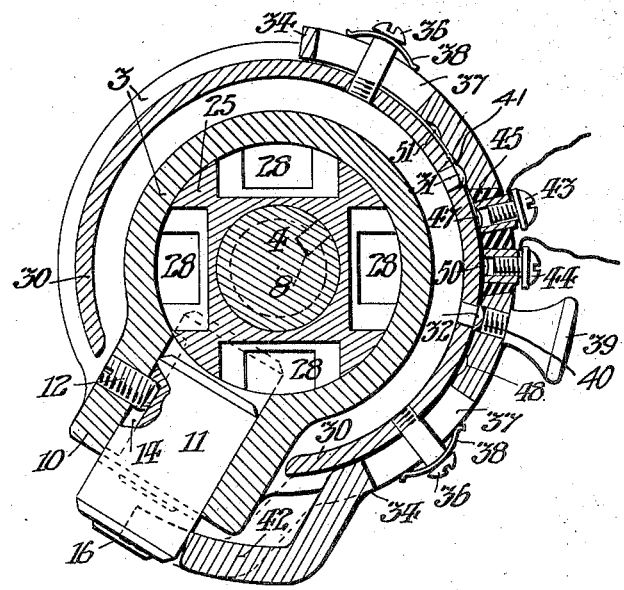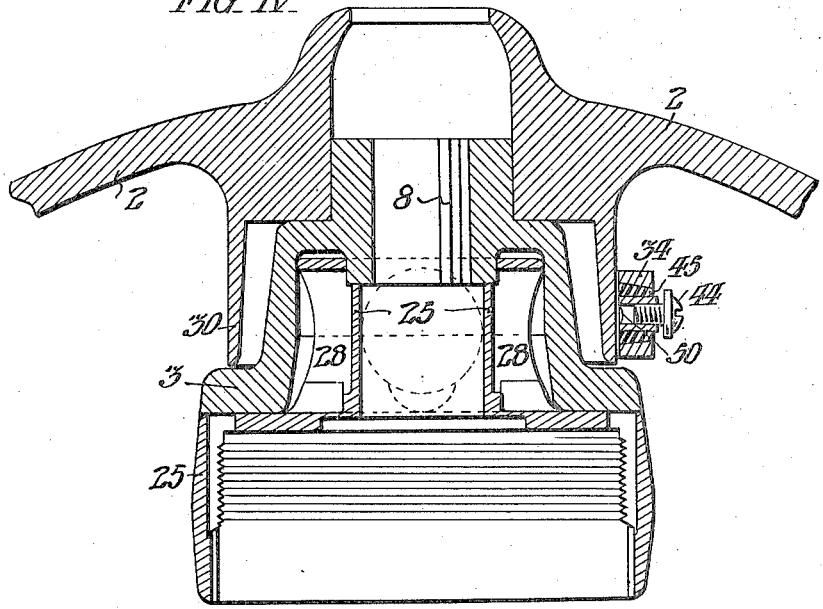

Sept. 22, 1925.  1,554,815
C. A. GODSHALK
AUTOMOBILE LOCK
Filed May 2, 1923   4 Sheets-Sheet 3
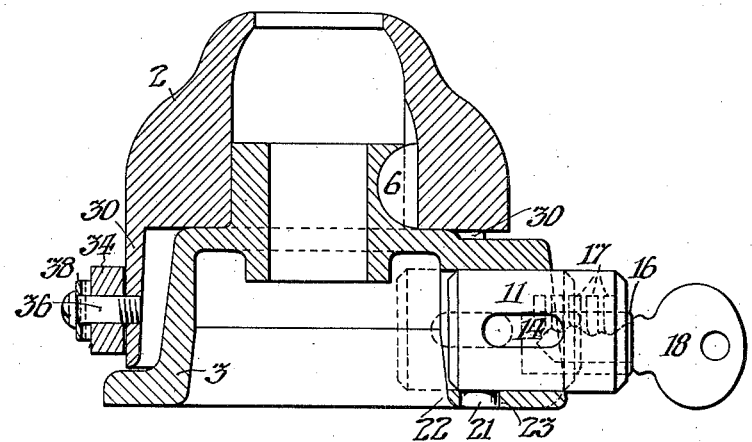
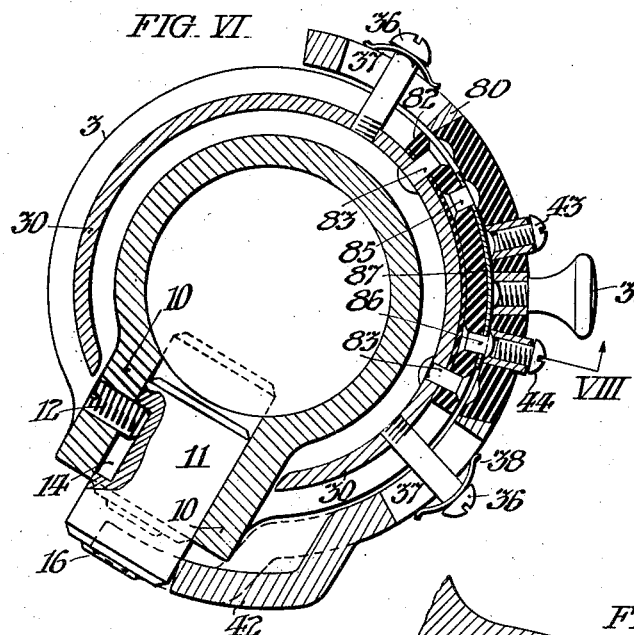
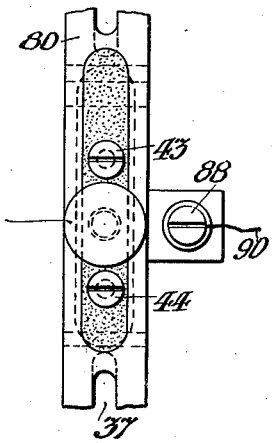
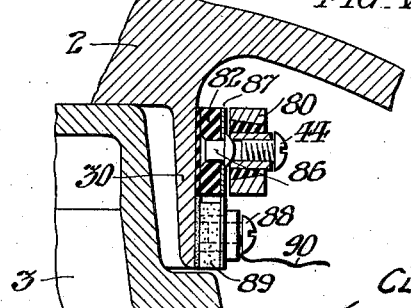
Inventor:
CLARENCE A. GODSHALK.

Sept. 22, 1925.
C. A. GODSHALK
AUTOMOBILE LOCK
Filed May 2, 1923
1,554,815
4 Sheets-Sheet 4
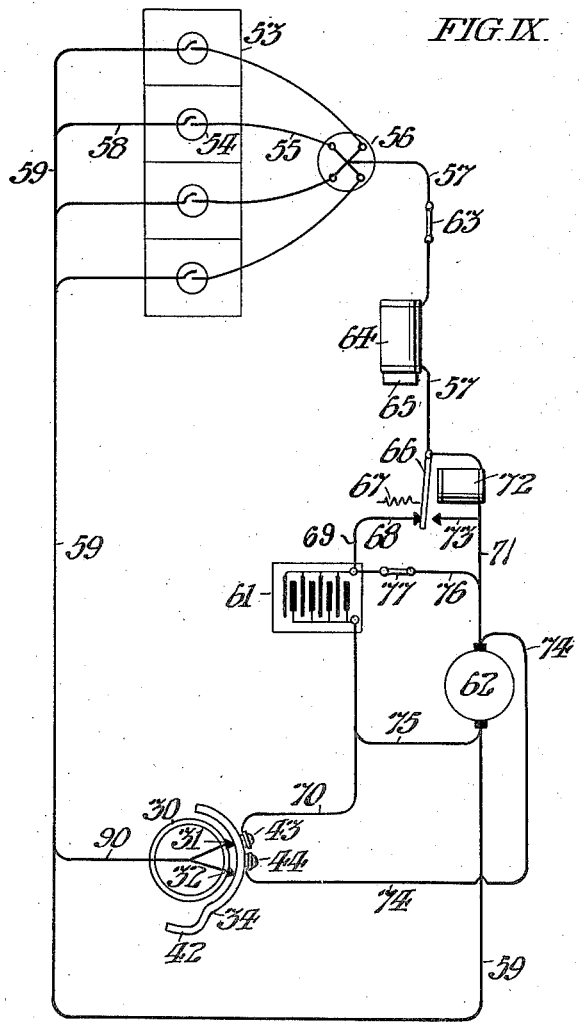
FIG. IX.
Inventor:
CLARENCE A. GODSHALK, Patented Sept. 22, 1925.

1,554,815

UNITED STATES PATENT OFFICE.

CLARENCE A. GODSHALK, OF ARDMORE, PENNSYLVANIA, ASSIGNOR TO A. H. FOX GUN COMPANY, OF PHILADELPHIA, PENNSYLVANIA, A CORPORATION OF PENNSYLVANIA.

AUTOMOBILE LOCK.

Application filed May 2, 1923. Serial No. 636,042.

*To all whom it may concern:*

Be it known that I, CLARENCE A. GODSHALK, a citizen of the United States, residing at Ardmore, in the county of Montgomery and State of Pennsylvania, have invented a certain new and useful Improvement in Automobile Locks, whereof the following is a specification, reference being had to the accompanying drawings.

My invention relates to means for preventing an automobile motor from being stopped until the automobile is so locked as to prevent its unauthorized use; the purpose of such construction and arrangement being to insure that the operator shall thus lock the automobile before leaving it.

I have found it convenient to illustrate my invention in conjunction with locking means for detachably rigidly connecting the steering shaft of an automobile with the bearing tube inclosing said shaft, so as to prevent the vehicle from being steered, when locked. Such embodiment of my invention is designed for use in conjunction with an automobile of the "Ford" type, and includes a lock of the pin tumbler key type, which may be permanently retained in connection with the vehicle, but alternately in two positions, in both of which it is locked, but in only one of which it locks the vehicle.

It may be observed that locking mechanisms of the general class above contemplated are claimed in Letters Patent of the United States No. 1,156,615 dated October 12, 1915 and No. 1,367,200 dated February 1, 1921, granted to James A. Murphey. However, said Letters Patent do not disclose any engine controlling means in connection with such lock mechanism.

As hereinafter described; my invention includes an electric switch carried by the steering wheel and including a slide member, having means to effect its movement manually, which movement is, however, limited in accordance with the disposition of the locking mechanism, in locked or unlocked position. Said slide is constructed and arranged so that it may remain in a neutral position with all of the circuits which it controls open and the motor stopped. Its movement, in one direction by the operator, closes the battery circuit in connection with the igniter of the internal combustion motor of the automobile to start said motor, and drive a magneto, and it is necessary to shift said slide in the opposite direction to ground the magneto to stop the motor, and the latter movement is prevented unless and until the locking mechanism is placed in locked position.

However, it is to be understood that I do not desire to limit my present invention to such locking mechanism, which I have merely chosen for convenience of illustration.

My invention includes the various novel features of construction and arrangement hereinafter more definitely specified.

In said drawings; Fig. I is a plan view of a steering wheel and its appurtenances embodying a convenient form of my invention applicable to steering mechanism of the Ford type.

Fig. II is a fragmentary side elevation of said wheel and steering mechanism.

Fig. III is a plan sectional view taken on the line III, III in Fig. II.

Fig. IV is a fragmentary vertical sectional view taken on the line IV, IV in Fig. I.

Fig. V is a fragmentary vertical sectional view taken on the line V, V in Fig. I.

Fig. VI is a plan sectional view, similar to Fig. III, but showing a modified form of my invention.

Fig. VII is a fragmentary side elevation of the movable switch sector shown in Fig. VI.

Fig. VIII is a fragmentary radial sectional view of the form of my invention shown in Figs. VI and VII, taken on the line VIII in Fig. VI.

Fig. IX is a wiring diagram showing the application of my invention to prevent an automobile motor from being stopped until the automobile is so locked as to prevent its unauthorized use.

Referring to the form of my invention shown in Figs. I to IV inclusive; the steering wheel comprises the rim 1, the spider 2 and the hub 3, all rigidly connected with the steering shaft 4. I find it convenient to connect said spider 2 with said hub 3 by the key 6 and tapered pin 7, and to connect said hub 3 with said shaft 4 by the key 8 and nut 9, the latter engaging a screw thread on said shaft 4.

Said hub 3 is conveniently provided with the lock casing 10 having a cylindrical bore in radial relation with the axis of said shaft 4, to receive the lock body 11 which is mounted to reciprocate therein. The extent of the radial reciprocation of said lock body 11 is limited by the screw 12 which is normally stationary in said lock casing and projects inwardly into the slot 14 in said lock body 11 and also prevents rotation of the latter. However, said lock body 11 has the key barrel 16 which is normally prevented from rotating therein by a series of pin tumblers 17 but, when the key 18 is inserted in the key hole 19 of said barrel 16; said barrel may be turned by said key to project and retract the lock slide bolt 21. Said slide bolt 21 is thus adapted for detachable engagement in either of the detent recesses 22 and 23 in said casing 10, to detain said lock body 11 in either its unlocked position, shown in full lines, or in its locked position, indicated in dotted lines in Figs. III and VI. It is to be understood that when said key 18 is turned to retract said slide bolt 21, and said lock body 11 is withdrawn to the limit of its slot 14, said slide bolt 21 registers with said recess 23 and may be engaged therewith to hold said lock body in said unlocked position shown in full lines. Said key 18 may be withdrawn from said lock whenever said lock bolt 21 is projected, but cannot be withdrawn from the lock when said bolt is retracted and, consequently, serves as a handle by which said lock body 11 may be reciprocated.

It is the purpose and effect of the locking devices above contemplated to prevent the operation of the steering mechanism of an automobile by preventing rotation of said steering wheel. In the form shown; said wheel hub 2 fits over a normally stationary internal gear case cover 25 which is in screw threaded engagement with an internal gear case 26 which is a fixture in the automobile at the top of the steering column. Said gear case cover 25 has a circumferential series of four lock recesses 28 into any one of which said lock body 11 may be projected and locked; so as to hold said steering wheel stationary in connection with said gear case 26.

However, it is to be understood that the specific form of lock mechanism above described, which is particularly adapted for automobiles of the "Ford" type, is not of the essence of my invention.

In said form of my invention shown in Figs. I to IV; said spider 2 has the depending cylindrical flange 30 provided with two metallic contact studs 31 and 32, rigidly connected therewith and thus in electrical connection with the frame work of the automobile. As best shown in Fig. III; the switch sector 34, which is conveniently formed of cast metal, is fitted in concentric relation with said flange 30 and yieldingly held in circumferentially slidable relation therewith, by means of the two screws 36 which are rigidly connected with said flange 30 and project through the respective slots 37 in said sector 34, and have respective springs 38 beneath their heads, bearing upon said sector and pressing the latter radially toward the axis of said steering wheel flange 30. Said sector 34 is provided with the knob 39 by which it may be manually shifted in either direction. Said knob has the recess 40 at its inner end adapted to engage said contact 32 to detain said sector 34 in the neutral position shown in Fig. III; in which position the contact 31 is engaged in the recess 41 in said sector. Accidental displacement is, of course, prevented by said springs 38. However, said sector 34 has the abutment 42 which is offset to a larger radius than said sector 34, to clear the lock casing 10 to such an extent as to encounter the lock 11 when the latter is in the unlocked position shown in Fig. III and thus limit the movement of said sector in that direction, until said lock is thrust radially inward to its locked position indicated in dotted lines in Fig. III. In other words; the movement of said slidable switch sector 34 is thus controlled by the position of the locking mechanism by which the operator may prevent unauthorized use of the automobile, as above described.

In the form of my invention shown in Figs. I to IV inclusive; I provide the switch sector 34 with two binding posts 43 and 44 which are insulated from each other and from said sector by the block of insulating material 45 in which they are mounted and which is tapered, as shown in Fig. III, and forced into a correspondingly shaped recess in said sector 34 and thus rigidly connected with the latter. Said binding post 43 has the recess 47 at its inner end adapted to electrically engage said contact 31 when said sector 34 is manually shifted in that direction. In order to permit said springs 38 to operate to thus electrically connect the binding post 43 with said contact 31; I provide said slide sector 34 with the recess 48 which will then register with and engage the contact 32. Similarly, said binding post 44 has the recess 50 at its inner end adapted to electrically engage the contact 32 when said slide sector 34 is shifted in that direction. In order to permit said springs 38 to operate to thus electrically connect the binding post 44 with said contact 32; I provide said slide sector 34 with the recess 51 which will then register with and engage the contact 31. As shown in Fig. III; said binding posts comprise clamping screws whereby ordinary electrical conductors may be connected therewith in any circuit in which it is desired to include my improved switch mechanism above described. Of course, such circuits may be of different character in accordance with the system of wiring of any automobile to which my invention may be accessory. However, in Fig. IX, I have indicated, diagrammatically, a typical circuit for an internal combustion automobile motor 53 including four cylinders, provided with respective spark plugs 54 and respectively connected by wires 55 with an ordinary rotary igniter 56 which is in fact a switch which successively makes electrical connection between the conductor 57 and the respective spark plugs 54 in any order predetermined by the arrangement of the wires 55. It is the usual present practice to use the metallic frame of the engine and the automobile as electric conductors leading from the spark plugs oppositely to said wires 55. However, in Fig. IX, I have indicated such conductors by the lines 58 and 59 which may, of course, be wires. As above described; the contacts 31 and 32, carried by the steering wheel flange 30 are in electrical connection with the frame. Therefore, I have indicated them in Fig. IX in connection with said line 59 which indicates such frame. In other words; in that embodiment of my invention; both contacts 31 and 32 are grounded in connection with the frame and thus with each of the spark plugs 54; but the binding posts 43 and 44 are used to complete the circuit to the igniter 56 through the conductor 57, conveniently as follows: Ordinarily, an automobile is provided with a storage battery 61 and with a rotary "magneto" or electric generator 62; such battery 61 being used to produce the required sparks at the gaps in the igniter 56 to start the automobile, and said generator 62 being rotated by the operation of the engine 53 thus initiated, by such battery, is thereafter used to continue such sparks and, incidentally, to maintain the battery 61 charged. Therefore, I have indicated an arrangement of that general character in Fig. IX, wherein the circuit comprising the conductor 57 is arranged to be manually opened and closed by the switch 63 in connection with the spark coil 64 which includes the usual automatic interrupter 65 to augment the voltage of the current supplied to said spark plugs. Said conductor 57 is adapted to be electrically connected with either said battery 61 or said generator 62 by the automatically operative switch 66 which, in Fig. IX, is shown held, by the spring 67, in contact with the terminal 68 of the conductor 69 leading to one pole of said storage battery 61. Ordinarily, the opposite pole of the battery would be "grounded," i. e., connected upon the frame of the automobile. However, in the arrangement of my invention shown in Fig. IX, the opposite pole of the battery 61 is provided with the conductor 70, which, instead of extending directly to the automobile frame, is connected with said binding post 43 on the switch sector 34, so that it is necessary to shift said sector counter-clockwise, with reference to Fig. IX, to ground that side of the battery, by bringing said binding post 43 into electrical connection with said contact 31 on the steering wheel flange 30. However, when said sector 34 is thus shifted from neutral position shown in Fig. III to the position shown in Fig. IX, with the circuit closed where the ordinary manually operative switch 63 is shown in said figure; the spark plugs 54 are supplied with current from said battery 61. It is to be understood that when my improved switch mechanism above described is employed, the ordinary manually operative switch 63 may be omitted to compel the operator to control the motor 53 by my improved switch mechanism.

The motor 53 being thus set in operation, actuates the generator 62 which is grounded upon one side as indicated at 59 in Fig. IX, and has its opposite side connected with said conductor 57 through the conductor 71 and automatic switch coil 72; so that, when the current produced by the operation of said generator 62 becomes sufficient; said switch coil 72 operates to shift said switch lever 66, contrary to the operation of the spring 67, to break the circuit between said spark plugs 54 and the battery 61 and establish the circuit between said spark plugs and the generator 62, by contact of said switch lever 66 with the switch terminal 73.

Thereafter, the motor 53 continues to operate in connection with the generator 62 and said switch sector 34 may be manually shifted to the neutral position shown in Fig. III, without stopping said motor. However, as one side of the generator 62 is grounded upon the frame of the automobile, as indicated at 59 in Fig. IX; the motor 53 may be stopped by also grounding the opposite side of said generator 62 and thus short-circuiting the spark plugs 54 and depriving them of the necessary energy. Therefore, to do that; I connect said switch binding post 44 with such opposite side of the generator, by the conductor 74; so that, when said switch sector 34 is manually shifted clockwise to the position shown in dotted lines in Fig. III, said binding post 44 electrically connects with said contact 32 and thus short-circuits said generator 62 and stops the motor 53. Of course, as above explained, such clockwise movement of the switch slide sector 34 cannot be effected when the lock body 11 is in the unlocked position shown in full lines in Fig. III. Consequently, the operator must lock the steering mechanism against unauthorized use, before he can stop said motor 53.

The conductors 75 and 76 shown in Fig. IX merely connect said battery 61 with said generator 62 so that the battery charge may be maintained by said generator. However, that charging circuit includes the switch 77 which may be manually operated to break said circuit.

Although I find it convenient to use the automobile frame as an electrical conductor for one side of the circuit in which my switch mechanism above described is included; I do not wish to limit myself to such construction or arrangement and, therefore, have shown in Figs. VI to VIII inclusive, a modified form of switch mechanism, which differs from that shown in the preceding figures in that means are provided to maintain the contacts which are rigidly connected with the steering wheel, insulated from the latter and, consequently, insulated from the frame of the automobile; so that my invention in that form may be embodied in any circuit in which wiring connections on both sides of the switch are desired.

In Figs. VI to VIII inclusive; the slidable switch sector 80 is of larger radius than said switch sector 34 so as to afford space between said sector 80 and the flange 30 on the steering wheel to insert the insulating block 82. Said block may be rigidly connected with said flange 30 by rivets 83 and thus supports the electrical contacts 85 and 86. As shown, both said contacts are electrically connected with the single conductor plate 87, which is provided with the single binding post 88 also insulated from said flange 30 by the block 89. As indicated in Figs. VII and VIII; a conductor 90 may be connected with said binding post 88 and be otherwise connected as indicated in Fig. IX.

However, as above indicated; I do not desire to limit myself to the particular embodiments of my invention herein set forth, as it is obvious that various modifications may be made therein without departing from the essential features of my invention, as defined in the appended claims.

I claim:

1. In automobile locks, the combination with a steering wheel and its shaft; of a bearing tube inclosing said shaft; locking means arranged to detachably rigidly connect said steering shaft with said bearing tube, so as to prevent the vehicle from being steered, when locked; including a radially movable lock body carried by said wheel; a member rigidly connected with said bearing and having a circumferential series of locking recesses adapted to receive said lock body in locked position; whereby both said wheel and shaft are held stationary when said lock is engaged with any of said recesses; an electric switch carried by said steering wheel and including an arcuate annular slide member, having means to effect its movement manually, in concentric relation with said shaft; the arcual movement of said slide member being limited in one direction by said lock body, when the latter is in unlocked position; electrical contact projections on said wheel; recessed electrical contacts on said slide member adapted to engage said contact projections; means yieldingly supporting said slide member in connection with said steering wheel, including studs projecting from said wheel through slots in said slide member and having springs normally pressing said slide member radially toward the axis of said wheel; whereby, said slide member has freedom for both arcual and radial movement with respect to the axis of said wheel; an internal combustion motor; an electric circuit including an igniter for said motor and two sources of electric energy, respectively a rotary generator and a storage battery; said slide and contacts being so arranged that the electrical connections between them are broken when said slide member is in neutral position, said slide member being movable arcually in one direction to close the battery circuit in connection with said igniter, whereby said motor is caused to drive said generator, and said slide being arcually movable in the opposite direction to ground said generator and stop said motor; the latter movement being prevented unless and until the locking mechanism is placed in locked position; whereby the operator is prevented from stopping said motor until the vehicle is so locked as to prevent its unauthorized use.

2. In automobile locks, the combination with a steering wheel and its shaft; of a bearing for said shaft; locking means arranged to detachably rigidly connect said steering shaft with said bearing, so as to prevent the vehicle from being steered, when locked; including a lock body carried by said wheel; a member rigidly connected with said bearing and having a series of locking recesses adapted to receive said lock body in locked position; whereby both said wheel and shaft are held stationary when said lock is engaged with any of said recesses; an electric switch carried by said steering wheel and including a slide member, in concentric relation with said shaft and adapted for arcuate movement; the arcual movement of said slide member being limited by said lock body, when the latter is in unlocked position; electrical contact projections on said wheel; recessed electrical contacts on said slide member adapted to engage said contact projections; means yieldingly supporting said slide member in connection with said steering wheel; whereby, said slide member has freedom for both arcual and radial movement with respect to the axis of said wheel; an internal combustion motor; an electric circuit including an igniter for said motor and two sources of electric energy, respectively a rotary generator and a storage battery; said slide and contacts being so arranged that the electrical connections between them are broken when said slide member is in neutral position, said slide member being movable arcually in one direction to close the battery circuit in connection with said igniter, whereby said motor is caused to drive said generator, and said slide being arcually movable in the opposite direction to ground said generator and stop said motor; the latter movement being prevented unless and until the locking mechanism is placed in locked position; whereby the operator is prevented from stopping said motor until the vehicle is so locked as to prevent its unauthorized use.

3. In automobile locks, the combination with a steering wheel and its shaft; of a bearing for said shaft; locking means arranged to detachably rigidly connect said steering shaft with said bearing, so as to prevent the vehicle from being steered, when locked; including a radially movable lock body; an electric switch slide member carried by said steering wheel in concentric relation with said shaft and adapted for arcuate movement; the arcual movement of said slide member being limited by said lock body, when the latter is in unlocked position; electrical contacts on said wheel; electrical contacts on said slide member adapted to engage said wheel contacts; means yieldingly supporting said slide member in connection with said steering wheel; whereby, said slide member has freedom for both arcual and radial movement with respect to the axis of said wheel; an internal combustion motor; an electric circuit including an igniter for said motor, a rotary generator and a storage battery; said slide and contacts being so arranged that the electrical connections between them are broken when said slide member is in neutral position, said slide member being movable arcually in one direction to close the battery circuit in connection with said igniter, and said slide being arcually movable in the opposite direction to stop said motor; the latter movement being prevented unless and until the locking mechanism is placed in locked position; whereby the operator is prevented from stopping said motor until the vehicle is so locked as to prevent its unauthorized use.

4. In automobile locks, the combination with a steering wheel and its shaft; of a bearing for said shaft; locking means arranged to detachably rigidly connect said steering shaft with said bearing, so as to prevent the vehicle from being steered, when locked; an electric switch slide member carried by said steering wheel; the movement of said slide member being limited in one direction by said locking means, when the latter is in unlocked position; electrical contacts on said wheel; electrical contacts on said slide member adapted to engage said wheel contacts; means yieldingly supporting said slide member in connection with said steering wheel; whereby, said slide member has freedom for both arcual and radial movement with respect to the axis of said wheel; an internal combustion motor; an electrical circuit including an igniter for said motor and a source of electric energy; said slide member being movable arcually in one direction to energize said igniter, and start said motor; and said slide being arcually movable to stop said motor; the latter movement being prevented unless and until the locking mechanism is placed in locked position; whereby the operator is prevented from stopping said motor until the vehicle is so locked as to prevent its unauthorized use.

5. In automobile locks, the combination with a steering wheel and its shaft; of a bearing for said shaft; locking means arranged to prevent the vehicle from being steered, when locked; an electric switch slide member carried by said steering wheel; movement of said slide member being limited by said lock body, when the latter is in unlocked position; electrical contacts on said wheel; electrical contacts on said slide member; means supporting said slide member in connection with said steering wheel; an internal combustion motor; an electric circuit including an igniter for said motor and two sources of electric energy, respectively a rotary generator and a storage battery; said slide and contacts being so arranged that the electrical connections between them are broken when said slide member is in neutral position, said slide member being movable in one direction to close the battery circuit in connection with said igniter, whereby said motor is caused to drive said generator, and said slide being movable in the opposite direction to stop said motor; the latter movement being prevented unless and until the locking mechanism is placed in locked position; whereby the operator is prevented from stopping said motor until the vehicle is so locked as to prevent its unauthorized use.

6. In automobile locks, the combination with a steering wheel and its shaft; of a bearing for said shaft; locking means arranged to prevent the vehicle from being steered, when locked; an electric switch slide member carried by said steering wheel; movement of said slide member being limited by said lock body, when the latter is in unlocked position; electrical contacts on said wheel; electrical contacts on said slide member; means supporting said slide member in connection with said steering wheel; an internal combustion motor; an electric circuit including an igniter for said motor and two sources of electric energy, respectively a rotary generator and a storage battery; said slide and contacts being so arranged that the electrical connections between them are broken when said slide member is in neutral position, said slide member being movable to close the battery circuit in connection with said igniter, whereby said motor is caused to drive said generator, and said slide being movable to stop said motor; the latter movement being prevented unless and until the locking mechanism is placed in locked position; whereby the operator is prevented from stopping said motor until the vehicle is so locked as to prevent its unauthorized use.

In testimony whereof, I have hereunto signed my name at Philadelphia, Pennsylvania, this 27th day of April, 1923.

CLARENCE A. GODSHALK.